(12) United States Patent
Bodenstein et al.

(10) Patent No.: US 10,712,825 B2
(45) Date of Patent: Jul. 14, 2020

(54) TOUCH-SENSITIVE INPUT DEVICE WITH IMPROVED GENERATION OF HAPTICS

(71) Applicant: PREH GMBH, Bad Neustadt a. d. Saale (DE)

(72) Inventors: Tobias Bodenstein, Salz (DE); Florian Wilm, Nüdlingen (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 0 days.

(21) Appl. No.: 16/277,314

(22) Filed: Feb. 15, 2019

(65) Prior Publication Data

US 2019/0302888 A1 Oct. 3, 2019

(30) Foreign Application Priority Data

Mar. 28, 2018 (DE) .................. 10 2018 107 382

(51) Int. Cl.
| | |
|---|---|
| *G06F 3/041* | (2006.01) |
| *G06F 3/01* | (2006.01) |
| *B60K 35/00* | (2006.01) |
| *G05G 5/03* | (2008.04) |

(52) U.S. Cl.
CPC .............. *G06F 3/016* (2013.01); *G06F 3/041* (2013.01); *B60K 35/00* (2013.01); *B60K 2370/1438* (2019.05); *G05G 5/03* (2013.01)

(58) Field of Classification Search
CPC ........... G06F 3/016; G06F 3/041; G05G 5/03; B60K 35/00; B60K 2370/1438; B60K 2370/158; B60K 2370/1446
See application file for complete search history.

(56) References Cited

U.S. PATENT DOCUMENTS

| | | | | |
|---|---|---|---|---|
| 6,429,846 | B2* | 8/2002 | Rosenberg | A63F 13/06 345/156 |
| 8,274,479 | B2* | 9/2012 | Prest | G06F 3/0338 345/169 |
| 2006/0250377 | A1* | 11/2006 | Zadesky | G06F 1/1613 345/173 |

(Continued)

FOREIGN PATENT DOCUMENTS

| | | |
|---|---|---|
| DE | 102016223021 A1 | 5/2018 |
| WO | 2018002028 A1 | 1/2018 |
| WO | 2018046302 A1 | 3/2018 |

*Primary Examiner* — Amit Chatly
(74) *Attorney, Agent, or Firm* — M&B IP Analysts, LLC

(57) ABSTRACT

The present disclosure relates to a touch-sensitive input device, including: a support; a touch-sensitive input component mounted on the support by a first spring means to elastically return along a deflection direction and is oscillation-capable; an absorber body mounted on the support by a second spring means to be movable along the deflection direction in an elastically returning and oscillation-capable manner; an actuating mechanism acting on the absorber body and the input component, with at least one direction of action having a component of the direction of action parallel to the deflection direction to cause a movement of the input component for generating haptic feedback along the deflection direction and cause movement of the absorber body in the direction opposite the movement of the input component; a mechanical trimming device for changing an effective spring length of a spring of the first spring means or the second spring means.

14 Claims, 3 Drawing Sheets

(56) References Cited

U.S. PATENT DOCUMENTS

Figure 1:
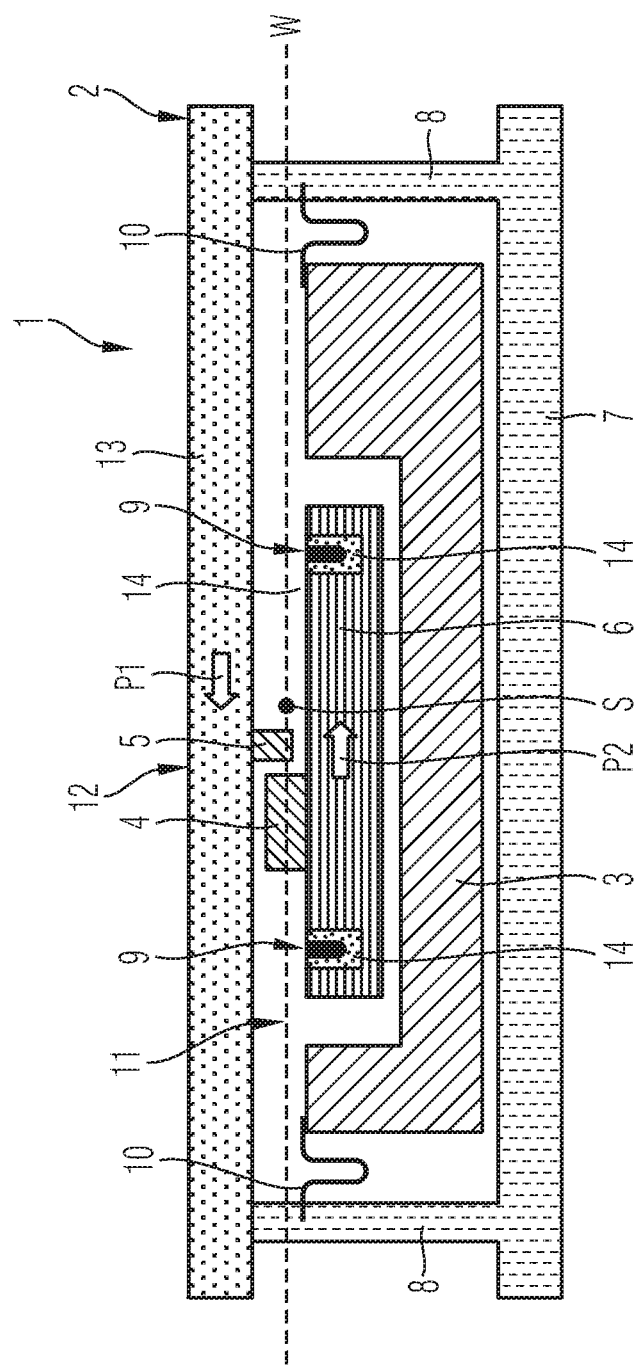

2009/0115733 A1* 5/2009 Ma .................... G06F 3/016
 345/173
2018/0240613 A1* 8/2018 Bodenstein ............ G06F 3/016
2019/0310708 A1* 10/2019 Bodenstein ............ H01F 7/126

* cited by examiner

TOUCH-SENSITIVE INPUT DEVICE WITH IMPROVED GENERATION OF HAPTICS

This application claims priority to the German Application No. 10 2018 107 382.8, filed Mar. 28, 2018, now pending, the contents of which are hereby incorporated by reference.

The present disclosure relates to touch-sensitive input device which comprises a support, a touch-sensitive input component, such as a touchpad or a touchscreen, in particular a touchscreen having a pixel matrix display, which is mounted on the support by means of first spring means so as to be movable in an elastically returning manner along at least one deflection direction. For example, this is a display with a liquid crystal structure or with an OLED design. For example, the touchpad or touchscreen has a capacitive electrode sensor system for a spatially resolving touch detection. In one embodiment, a force sensor for measuring an actuating force, which accompanies a touch and acts on the touch-sensitive display, is additionally or alternatively provided.

Generically, an actuating mechanism having at least one actuator is furthermore provided, which drives the input component along the deflection direction in order to generate a haptic feedback when a touch has taken place and/or a predefined actuating force measured by the force sensor is exceeded, in order to, in the end, provide the operator with a feedback that a touch and/or actuation has been detected, and that a switching or control process is possibly assigned thereto.

In the conventional input devices, the actuator is directly supported on the support, which, as a rule, substantially consists of a thermoplastic material. Thus, oscillatory pulses produced, in particular, as counter-pulses in the generation of haptics, are coupled into the housing. These excitations, which are undesirable and hereinafter referred to as secondary oscillations, are acoustically perceived by the operator due to structure-borne sound radiation or in the form of vibrations of other components, and considered to be distracting. In order to avoid oscillations from being coupled into the support, providing an oscillation absorber in the form of an absorber body mounted so as to be capable of oscillating is proposed. This may be a passive or active oscillation absorber, wherein, due to its excitation, the excitation of the support, which accompanies the haptic oscillatory excitation and is based on the reaction force, is minimized or damped by energy removal. In order to cause an effective oscillatory absorption, it is necessary to adjust to each other the natural frequencies of the systems capable of oscillating, on the one hand, the input component mounted so as to be capable of oscillating and, on the other hand, the absorber mass mounted so as to be capable of oscillating. It was found that the manufacturing tolerances make a subsequent adjustment necessary. There is therefore a need for providing a suitable and reliable re-adjustment of the generic input device. There is a further need for designing the generation of haptics in such a way that the result during the generation of haptics is a predefined, reproducible motion path, in particular a motion path as it was originally initiated by the actuator, e.g. a substantially transversal motion path. At the same time, such input devices are subject to the general requirement of saving construction space.

Therefore, the present disclosure is based on the object of providing an input device with a haptic feedback by means of actuator-based excitation of movement, in which an improved excitation of movement by means of the actuating mechanism is ensured by the undesirable secondary oscillations mentioned in the introduction being reduced, so that the input device, on the whole, is improved with regard to oscillations, is realized in an, in particular, construction space-saving manner, and, in particular, a simplified re-adjustment is made possible.

According to the present disclosure, the object is achieved by a touch-sensitive input device with the features of claim 1. An equally advantageous use is the subject matter of the independent claim. It must be noted that the features and measures cited individually in the following description can be combined with each other in any technologically meaningful manner and represent other embodiments of the present disclosure. The description, in particular in connection with the figures, additionally characterizes and specifies the present disclosure.

The input device according to the present disclosure comprises a support. The term "support" is to be interpreted broadly and generally serves the function of fixing and retaining the input device, for example on an inner trim, a center console or a dashboard of a motor vehicle. For example, the support is made of plastic, such as a thermoplastic material.

According to the present disclosure, a touch-sensitive input component is also provided. The term "touch-sensitive input component" is also to be interpreted broadly. Generally, this is a component of the input device defining an input surface facing towards the operator, on which a touch by means of an input means or a finger of the operator is detected, preferably detected in a spatially resolving manner, by means of a sensor system. Preferably, the touch-sensitive input component is a touchpad, i.e. a displayless input component with a spatially resolving detection of a touch on an input surface associated with the input component, i.e. an input component with a spatially resolving detection of a touch on an input surface associated with the input component, wherein in the latter case, an electronic display, particularly an electronic pixel matrix display, is associated with the input surface.

For example, one or more sensors for detecting a touch and/or a pressing force on the input surface are assigned to the input surface. For example, these are several electrodes arranged in a matrix and an associated evaluation unit for a spatially resolving touch detection and/or one or more force sensors for the detection of the pressing force caused by the actuation, such as one or more capacitive force sensors.

Furthermore, first spring means are provided, by means of which the input component is mounted on the support so as to be movable at least along one deflection direction in an elastically returning and oscillation-capable manner. Thus, the first spring means serve both for mounting and elastically returning the input component into a rest position. Preferably, the first spring means are formed as metal sheets of spring steel.

According to the present disclosure, it is proposed to provide an absorber body, which is mounted on the support by means of second spring means in an elastically returning and oscillation-capable manner al least along the deflection direction. For example, an absorber body is understood to be a body having a greater mass density than a touch-sensitive display, e.g. of more than 2,000 kg/m³, preferably more than 7,000 kg/m³, still more preferably more than 10,000 kg/m³. The absorber body may be shaped in any way. Preferably, the absorber body is made from a metal, such as zinc or lead or a metallic alloy, such as an alloy containing zinc or lead, e.g. ZAMAK.

Further, an actuating mechanism is provided according to the present disclosure, in order to movingly drive the input component for generating a haptic feedback. For example, the actuating mechanism comprises one or more actuators. Preferably, they are linearly driving actuators in each case. Preferably, the actuator in each case is an electro-motive or electromagnetic actuator. For example, the actuator in each case has a coil, whose electromagnetic field generated by the coil is configured and arranged for cooperation with an armature. According to the present disclosure, this actuating mechanism defines a direction of action with at least one component of the direction of action parallel to the deflection direction. Preferably, the direction of action is substantially parallel to the deflection direction. According to the present disclosure, the actuating mechanism is provided for causing a movement of the input component, e.g. of the touch-sensitive display, for generating a haptic feedback in the deflection direction and substantially simultaneously causing a movement of the absorber body in the direction opposite to the movement of the input component along the deflection direction.

According to the present disclosure, at least one mechanical trimming device is provided for changing an effective spring length of at least one spring of the first spring means and/or the second spring means. The freely oscillating section of the respective spring between the attachment portions thereof is understood to be the effective spring length. By shortening the effective spring length, the natural frequency is changed towards higher frequencies, and by lengthening the effective spring length, the natural frequency is changed towards lower frequencies. The trimming device makes an adjustment of the natural frequency behavior of the associated oscillation-capable system possible. The undesired deviations from the intended and desired oscillation behavior resulting from manufacturing tolerances, such as deviations of mass, can thus be compensated, and the touch-sensitive input device can be adjusted without a change of the mass ratios, which is generally possible only to a limited extent. Further, equipment-related changes of the mass ratios can thus be compensated by simple trimming, without replacing the spring means, such as a replacement of the touchscreen model in the current series.

According to one embodiment, the actuating mechanism has an actuator acting between the input component and the absorber body, which, on the one hand, is supported by the absorber body and, on the other hand, acts in an attracting or repelling manner on the input component in order to cause a movement of the input component for generating a haptic feedback substantially opposite to the deflection of the absorber body. Preferably, the actuator is designed to trigger an approaching movement between the input component and the absorber body. In this embodiment, the absorber body acts similar to a passive oscillation absorber. Due to the actuator being supported by the absorber body mounted so as to capable of oscillating, the generation of haptics caused by the actuator can be decoupled from the support in an improved manner, with respect to oscillation and thus, acoustics, because according to the present disclosure, the actuator is not supported directly on the support, but by the absorber body movably mounted on the support. This causes the generation of haptics to be decoupled. As was mentioned above, the actuator is, for example, an electromagnetic actuator, and the means of the actuator generating the magnetic field are attached to the absorber body while the associated armature is attached to the input component. Particularly in this embodiment of the actuator, the respective masses of the armature and the coil are in each case also to be taken into account and added when considering the mass of the absorber body and input component.

According to an alternative embodiment, the actuating mechanism has a first actuator acting between the support and the input component for causing the movement of the input component, and a second actuator acting between the support and the absorber body for causing the movement of the absorber body. Thus, the absorber body with the associated second actuator may be referred to as an active oscillation absorber. This embodiment is advantageous in that a very controlled activation of the second actuator is made possible which, if necessary, is independent of the activation of the first actuator and for haptic excitation.

Preferably, the first spring means and the second spring means have several springs respectively formed from a steel spring sheet, which respectively have two attachment portions and a freely oscillating bending portion disposed therebetween, which defines the effective spring length. Preferably, the first and second spring means are configured as steel spring sheets that are U-shaped in some portions. For example, the second spring means associated with the absorber body include four springs, and the first spring means associated with the input component also include four springs. For example, the springs are stamped parts manufactured from spring sheet metal.

Preferably, the first spring means and the second spring means are substantially disposed in a common plane.

According to a preferred embodiment, the trimming device has at least one, preferably in each case two, clamping members fixing the spring in the respective attachment portion, wherein the effective spring length can be varied by varying the relative position of the clamping member or clamping members with respect to the support or the absorber body or the input component. The clamping of the springs is achieved by means of the clamping members in order to avoid buckling or bending. Preferably, the clamping members are integrally connected for each spring, for example by means of a connecting web. In one embodiment, the web is provided for facilitating the assembly of the springs.

In a preferred embodiment, the position of the clamping members is mechanically encoded, for example by means of a tongue-and-groove connection, i.e. only predefined positions can be assumed by the clamping member.

According to one embodiment, the input component, in addition to the actual commercially available touchpad or touchscreen, may have an additional body rigidly connected thereto. For example, an additional body is understood to be a body having a greater mass density than a touch-sensitive display, e.g. of more than 2,000 kg/m$^3$, preferably more than 7,000 kg/m$^3$, still more preferably more than 10,000 kg/m$^3$. The additional mass may be shaped in any way. Preferably, the additional mass is made from a metal, such as zinc or lead or a metallic alloy, such as an alloy containing zinc and/or lead, e.g. ZAMAK. Preferably, the additional mass is provided on the side of the touchscreen or touchpad facing away from the operator. The task of the additional mass is that the center of gravity of the input component is disposed outside the volume defined by the touchpad of touchscreen and is disposed on the axis of action of the actuating mechanism as far as possible, in order to minimize the danger of an excitation of a rotary movement, particularly of the input component, that interferes with the haptics.

In order to realize a particularly compact embodiment with, at the same time, a pronounced displacement of the center of gravity, the support is arranged such, according to a preferred embodiment, that it reaches into a hollow volume defined by the input component.

For example, the resonance frequencies of the systems capable of oscillating consisting of the absorber body on the one hand and of the input component on the other hand are substantially designed to match, by the respective spring constants of the first and second spring means being adjusted so as to match the masses.

Preferably, the first spring means and the second spring means are disposed in a common plane.

According to another preferred embodiment, at least one damping member is also provided. Advantageously, the deflection speeds or the maximum deflections of the input component and/or the absorber body can thus be limited. Preferably, the damping member is provided between the support and the absorber body in order to have a damping effect with regard to the deflection of the absorber body. For example, a device generating static, rolling, sliding or viscous friction, which counteracts the movement of the input component or the absorber body and thus causes the oscillation amplitude to decrease, is understood to be a damping member.

Preferably, the mass of the absorber body inclusive of the above-described coil is smaller than the mass of the input component.

Preferably, the mass of the absorber body is greater than a quarter of the mass of the input component, e.g. than the mass of the additional body and the touchpad or touchscreen.

Preferably, the direction of action of the actuating mechanism is parallel to an input surface defined by the input component.

Preferably, the center of gravity defined by the input component is situated on an axis of the actuating mechanism described by the direction of action.

For example, the absorber body is configured in a plate-shaped manner. As regards the spatial relationship with regard to an operator, the absorber body is preferably disposed underneath the input component, preferably between the input component and the support.

Furthermore, the present disclosure relates to the use of the touch-sensitive input device in one of the above-described embodiments in a motor vehicle, in particular in a center console of a motor vehicle.

Figure 2:
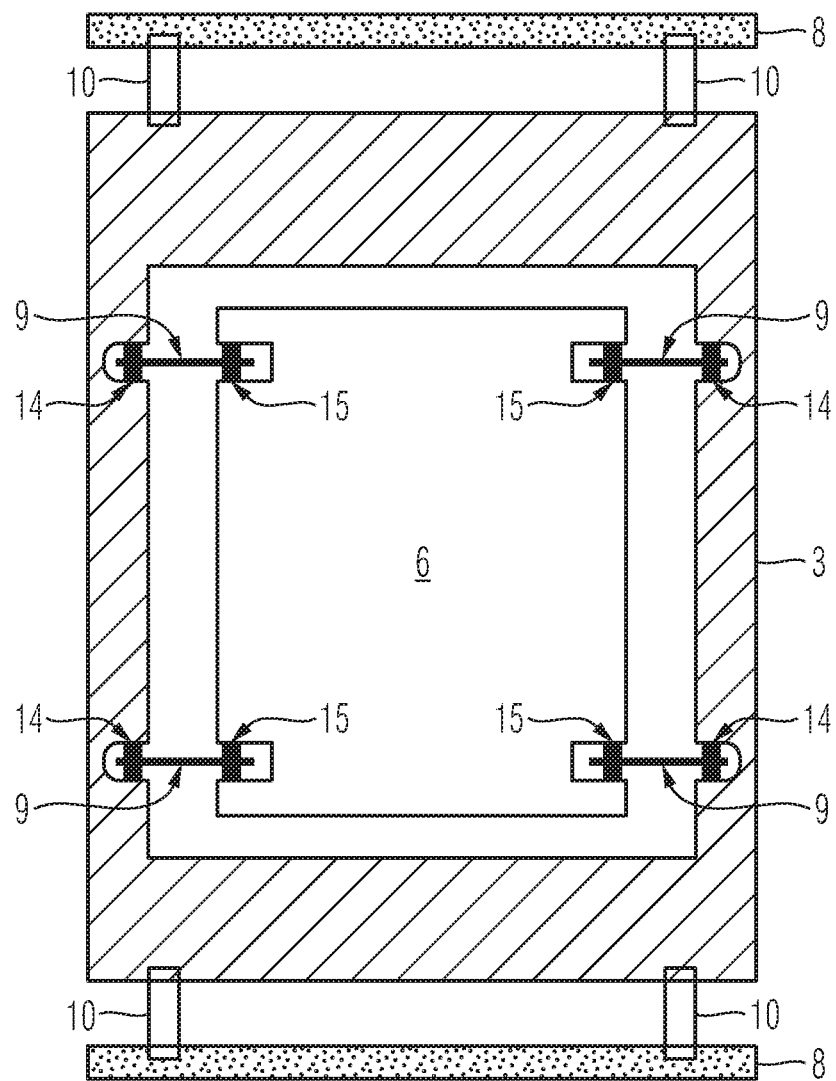
Figure 3:
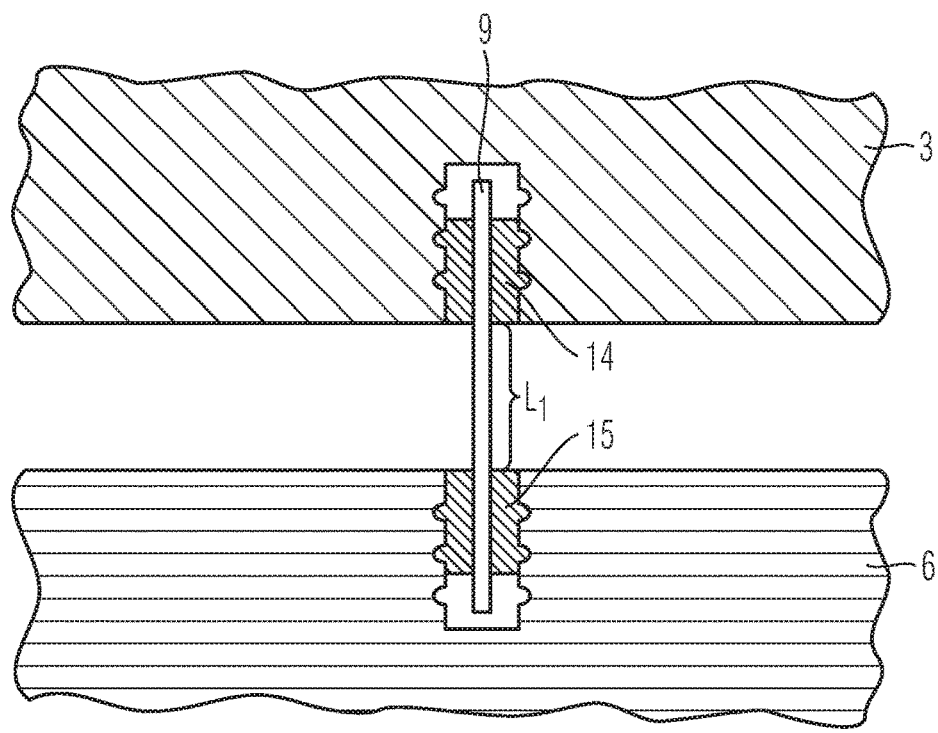
Figure 4:
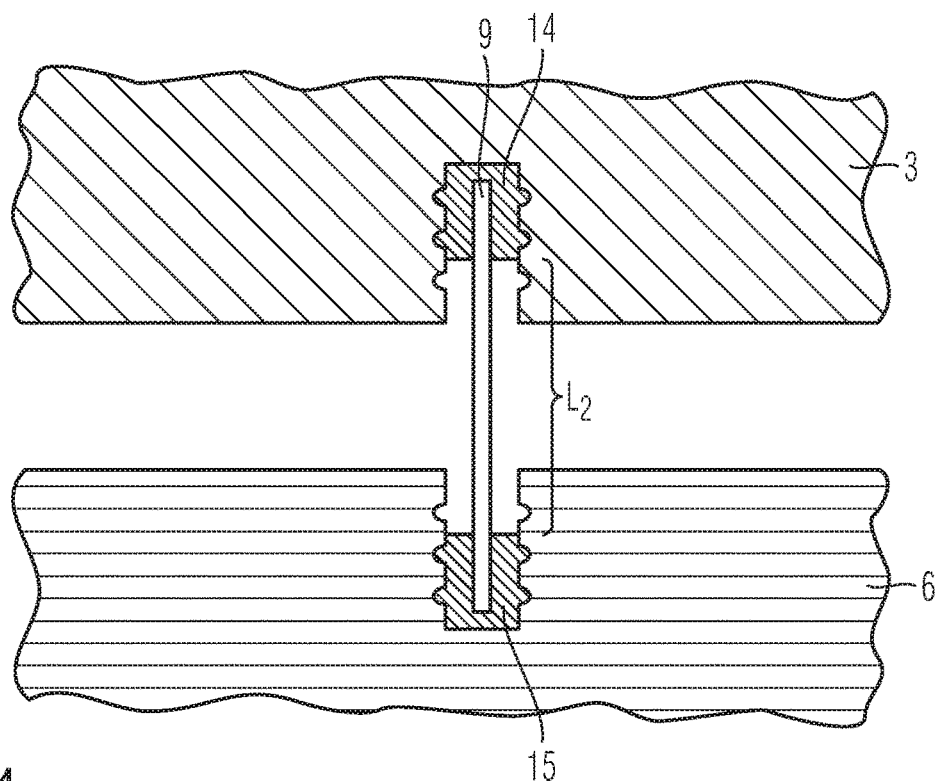

The present disclosure as well as the technical environment are explained below in more detail with reference to the Figure. It must be remarked that the Figures depict a particularly preferred embodiment of the present disclosure, but that the invention is not limited thereto. The Figures schematically show:

FIG. 1 a sectional view of an inventive embodiment of the input device;

FIG. 2 a sectional view, orthogonal to FIG. 1, of the inventive embodiment of the input device;

FIG. 3 a detailed view of the input device from FIG. 1, wherein the trimming device is adjusted to a first effective spring length L1;

FIG. 4 a detailed view of the input device from FIG. 1, wherein the trimming device is adjusted to a second effective spring length L2.

FIGS. 1 and 2 show an inventive embodiment of the input device 1. It has a support 3 serving for the attachment of the input device 1 to a center console, which is not shown, or a dashboard, which is not shown, of a motor vehicle. An input component 2 is mounted on the support 3 so as to be elastically returning and oscillation-capable. It has a touchpad 13 facing towards the operator and an additional body 7 rigidly connected to the touchpad 13 by means of the attaching posts 8. As an alternative to the touchpad 13, a touchscreen may be provided, i.e. a combination of an electronic pixel matrix display with a touch sensor system. The touchpad 13 detects the touch of an operating means, e.g. of the finger of an operator, on the input surface 12 defined by the input component 2.

The input component 2 is mounted on the support 3 by means of first spring means 10 so as to be elastically returning and oscillation-capable. The first spring means 10 are four steel spring sheets that are configured in a U-shaped manner in some portions. The first spring means 10 are arranged in such a way that a returning movement of the input component 2, i.e. the touchpad 13 including the additional body 7 rigidly connected to the touchpad 13, in a direction parallel to the input surface 12 is possible.

The mass of the additional body 7 is chosen such that the center of gravity S of the entire input component 2 is located between the touchpad 13 and the additional body 7 and is thus disposed in the plane in which the direction of action of an electromagnetic actuator 4, which is indicated by the axis W, is situated, which actuator serves for the electromagnetically caused deflection of the input component 2 from the rest position, as indicated by the arrow P1, in order to cause a haptic feedback on the part of the operator due to the deflection and the possibility of haptically perceiving it by a finger touching the input surface 12. The actuator 4 has a coil and an armature 5, which cooperates with the magnetic field of the coil and is rigidly attached to the input component 2.

As FIG. 1 also shows, the actuator 4, in particular its coil, is supported on a plate-shaped absorber body 6, which in turn is mounted on the support 3 by means of second spring means 9 in an elastically returning and oscillation-capable manner. The second spring means 9 are also springs made of spring steel sheet metal, which, however, are not configured in a U-shaped manner like those the first spring means 10, but flat, as is shown in FIG. 2 and subsequently in FIGS. 3 and 4. The springs of the first spring means 10 and the second spring means 9 are substantially disposed in a common plane.

The mounting of the absorber body 6, which acts in an elastically returning manner and is capable of oscillation, and which is provided by the second spring means 9, serves for absorbing the counter-pulse P2 generated by the actuator 4, so that due to its elastic support, the actuator 4, and thus the generation of haptics, is decoupled from the support 3 via the absorber body 6 with regard to the transmission of impacts and oscillations. Thus, the sound transmission into the support 3 and, in particular, into the vehicle environment disposed adjacent to the support 3, such as a center console trim or the like, which is caused by the generation of haptics, is reduced.

Furthermore, the above-described additional body 7 and the position of the center of gravity S resulting due to the additional body 7 ensures that the input component 2, due to the actuator 4, receives an at least approximately, i.e. substantially, translational excitation of oscillation, i.e. if possible without rotary oscillation modes. As is apparent from FIG. 1, the actuator 4, the absorber body and the support 3 are wholly or at least partially disposed in a hollow volume 11 defined by the input component 2. On the one hand, a construction space-saving design of the input device 1 is thus achieved. On the other hand, an excitation of movement by means of the actuator 4, which is purely translational, if possible, i.e. as free as possible from rotary oscillation, can be realized by this design. Only due to the construction defining the cavity 11 is it possible that the axis of action W of the actuator intersects the common center of gravity of the input component 2 and the additional body 7 and at the same time that the axis described by the direction of action W extends parallel to the input surface 12. The mass of the absorber body 6 inclusive of the coil associated with the actuator 4 is smaller than the mass of the input component 2, but at the same time greater than one quarter of the mass of the input component 2.

In order to realize a construction space-saving embodiment, the absorber body 6 is disposed in a recess of the support 3. In order to adjust the respective deflection speeds of the absorber body 6 on the one hand and of the input component 2 on the other hand, an exact adjustment of the spring constant of the second spring means 9 in each case compared to the spring constants of the first spring means 10 is required. The springs of the first spring means 10 and those of the second spring means 9 have several springs respectively formed from a steel spring sheet, with two attachment portions in each case and a freely oscillating bending portion disposed therebetween, which defines the effective spring length L1 or L2.

In order to vary the spring constants of the second spring means 9, one trimming device 14, 15 is in each case provided on all springs of the second spring means 9, as is shown in FIG. 2 and, in detail, in the FIGS. 3 and 4. For each spring, the trimming device 14, 15 has a clamping member 14 and 15 fixing the spring of the second spring means 9 in the respective attachment portion on the support 3 or the absorber body 6, wherein the effective spring length L1 or L2 can be varied by varying the relative position of the clamping members 14 and 15. Thus, FIG. 3 shows a spring length L2, which is increased compared with the spring length L1 shown in FIG. 2 and which results from the position of the clamping members 14, 15 resulting from the change of the position of the clamping members 14, 15. In this case, the position of the clamping members 14, 15 cannot be freely selected in an arbitrary manner, but is mechanically encoded, with respect to the support 3 or with respect to the absorber body 6, by tongue-and-groove recesses, in such a way that only certain predefined positions are possible.

The invention claimed is:

1. A touch-sensitive input device, comprising:
    a support;
    a touch-sensitive input component which is mounted on the support by a first spring so as to be elastically returned along a deflection direction and oscillation-capable;
    an absorber body, which is mounted on the support by means of second spring so as to be movable at least along the deflection direction in an elastically returning and oscillation-capable manner;
    an actuating mechanism acting on the absorber body and the input component, with at least one direction of action having a component of the direction of action parallel to the deflection direction in order to cause a movement of the input component for generating a haptic feedback along the deflection direction and cause a movement of the absorber body in the direction opposite to the movement of the input component;
    at least one mechanical trimming device for changing an effective spring length of at least one spring of the first spring or the second spring.

2. The touch-sensitive input device of claim 1, wherein the actuating mechanism has a first actuator acting between the support and the input component for causing the movement of the input component, and a second actuator acting between the support and the absorber body for causing the movement of the absorber body.

3. The touch-sensitive input device of claim 1, wherein the actuating mechanism has an actuator acting between the input component and the absorber body for causing the movement of the input component and the absorber body.

4. The touch-sensitive input device of claim 1, wherein the first spring and the second spring have several springs respectively formed from a steel spring sheet, which respectively have two attachment portions and a bending portion disposed therebetween, which is capable of freely oscillating and defines the effective spring length.

5. The touch-sensitive input device of claim 1, wherein the trimming device has at least one clamping member fixing the spring in the respective attachment portion, and the effective spring length can be varied by varying the relative position of the clamping member.

6. The touch-sensitive input device of claim 5, wherein the clamping members of the trimming device associated with a spring are integrally connected with each other.

7. The touch-sensitive input device of claim 5, wherein the position of the clamping member of the trimming device is mechanically encoded.

8. The touch-sensitive input device of claim 1, with a damping member provided between the support and the absorber body.

9. The touch-sensitive input device of claim 1, wherein the mass of the absorber body is smaller than the mass of the input component.

10. The touch-sensitive input device of claim 9, wherein the mass of the absorber body is larger than a quarter of the mass of the input component.

11. The touch-sensitive input device of claim 1, wherein the direction of action is parallel to an input surface defined by the input component.

12. The touch-sensitive input device of claim 1, wherein the center of gravity defined by the input component is situated on an axis defined by the direction of action.

13. The touch-sensitive input device of claim 1, wherein the actuator of the actuating mechanism is in each case an electromagnetic linear actuator, preferably an electromagnetic linear actuator with a flat armature.

14. The touch-sensitive input device of claim 1 adapted for use in a motor vehicle.

* * * * *